(No Model.)
J. E. EMERSON & T. MIDGLEY.
MANUFACTURE OF HOSE OR TUBING.
No. 386,306. Patented July 17, 1888.
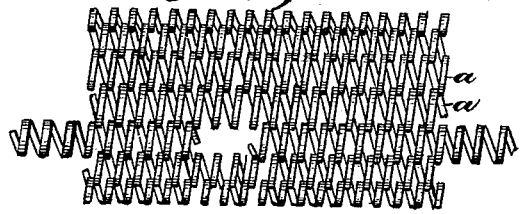
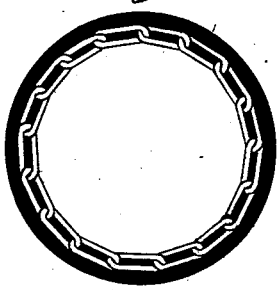
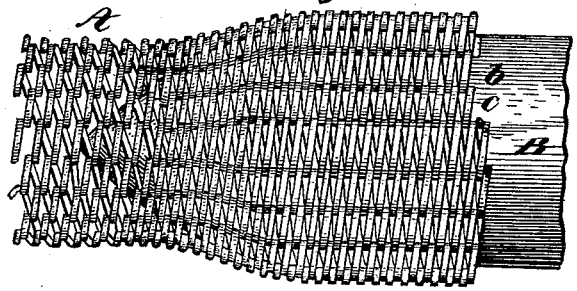
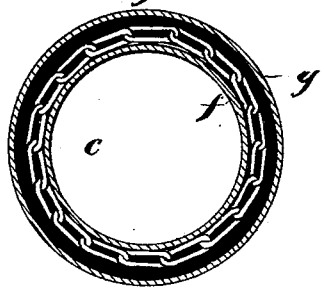
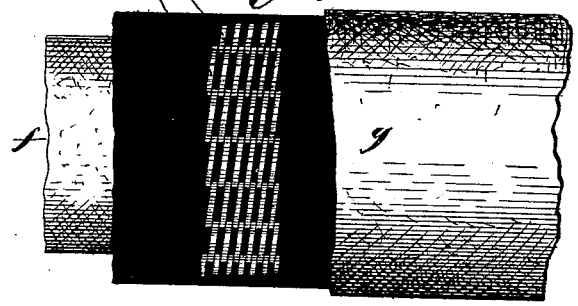
Witnesses
Inventor

UNITED STATES PATENT OFFICE.

JAMES E. EMERSON AND THOMAS MIDGLEY, OF BEAVER FALLS, PENNSYLVANIA.

MANUFACTURE OF HOSE OR TUBING.

SPECIFICATION forming part of Letters Patent No. 386,306, dated July 17, 1888.

Original application filed February 10, 1888, Serial No. 263,902. Divided and this application filed February 29, 1888. Serial No. 265,722. (No model.)

*To all whom it may concern:*

Be it known that we, JAMES E. EMERSON and THOMAS MIDGLEY, citizens of the United States, residing at Beaver Falls, in the county of Beaver and State of Pennsylvania, have invented certain new and useful Improvements in the Method of Manufacturing Flexible Hose or Tubing; and we do hereby declare the following to be a full, clear, and exact description of the invention, such as will enable others skilled in the art to which it appertains to make and use the same.

Our invention relates to a method of manufacturing hose or tubing, and has for its object the construction of hose of great strength for hydraulic mining, firemen's service, and other purposes where hose is subjected to great internal or external pressure. The invention will be hereinafter described, and particularly pointed out in the claim.

In the accompanying drawings, which form a part of this specification, Figure 1 represents a plan view, partly in section, of a tube of coiled sections of wire. Fig. 2 is a similar view of a tube and a mandrel for stretching the links of the coils. Fig. 3 is a side view, partly in section, of the completed hose. Fig. 4 is a cross-section showing the metallic body covered with rubber, and Fig. 5 is a similar view showing the external and internal surfaces of the hose covered with rubber and fabric, respectively.

Reference being had to the drawings and the letters marked thereon, A represents a tube formed of sections $a$ of coiled helices interwoven longitudinally, as shown in Fig. 1, which form links $b\ c$. In forming this tube the sections $a$ are coiled in suitable lengths and of a diameter to adapt them to the size of hose desired to be made. In practice we have found that sections in about sixteen (16) foot lengths can be handled with facility and enable the workman to make a tube very rapidly. The tube is formed on a core of a diameter about equal to the desired internal diameter of the hose when completed, and the sections $a$ are screwed together so as to make the separate sections terminate at different points in the circumference of the tube, to prevent weakening the tube at any point sufficiently to affect its durability, or the sections $a$ may be of the entire length of a section of hose to be made. After the tube A has been formed by interweaving its sections, it is heated and drawn over a mandrel, B, which is formed with a tapering end to enter the tube and gradually stretch the helices into links $b\ c$ and expand the tube about one-third ($\frac{1}{3}$) of its diameter, as shown at C in Fig. 2. In some instances the tube A may be made of soft or annealed wire, when it will not be necessary to heat it to stretch the helices and expand the tube. After the tube has been expanded it may or may not be tempered. C, in Figs. 2 and 3, represents the tube after it has been expanded, and as thus formed presents a flexible body of great strength and capable of resisting intense internal pressure. The metallic tube is then covered with a tube, $e$, of rubber, and the two subjected to heat, by which the rubber is melted or softened sufficiently to cause it to flow through the interstices between the links in the metallic tube and form a compound inner surface of metal and rubber, the rubber completely filling the interstices and rendering the hose or tube absolutely water-repellent and air-tight. Instead of covering the metallic tube with a tube of rubber, it may be coated with other flexible plastic material—such as gutta-percha—to fill the interstices and cover the outer surface of the metal, and a lining and covering of canvas previously coated or treated with a paint or compound for the purpose, which renders the canvas water-repellent and becomes adhesive under heat, may be applied. The hose may thus be made to present a rubber external surface and a compound internal surface, or it may be provided with a lining, $f$, and a covering, $g$, of canvas, which will adhere to the rubber and form a homogeneous body.

Hose thus constructed is capable of resisting great external as well as internal pressure, and may be driven over by ordinary road-vehicles when filled with fluid without injury to the hose or the motor supplying the fluid, while it is sufficiently flexible to be wound upon a reel, and may be used in any place where ordinary hose is applied.

The hose manufactured by our method is claimed in our application, Serial No. 263,902, filed February 10, 1888, of which this application is a division.

Having thus fully described our invention, what we claim is—

The method of manufacturing the within-described flexible hose, which consists in interweaving sections of coiled wire and forming a tube, expanding the tube and elongating the links, then covering the tube with rubber or its equivalent material, and subjecting the whole to heat, for the purpose set forth.

In testimony whereof we affix our signatures in presence of two witnesses.

JAMES E. EMERSON.
THOMAS MIDGLEY.

Witnesses:
J. F. MERRIMAN,
T. R. HENNON.